United States Patent [19]

Oh et al.

[11] Patent Number: 5,740,212

[45] Date of Patent: Apr. 14, 1998

[54] DELAY CIRCUIT OF PCM DATA

[75] Inventors: Don-Sung Oh; Dong-Jin Shin; Young-Dae Lee, all of Daejeon, Rep. of Korea

[73] Assignee: Electronics and Telecommunications Research Institute, Daejeon, Rep. of Korea

[21] Appl. No.: 696,090

[22] Filed: Aug. 13, 1996

[30] Foreign Application Priority Data

Oct. 31, 1995 [KR] Rep. of Korea ............... 1995-38766

[51] Int. Cl.⁶ ............................................. H04L 7/00
[52] U.S. Cl. ................................... 375/372; 365/220
[58] Field of Search ........................ 375/242, 371, 375/372, 373; 370/517, 516; 365/194, 189.01, 219–221; 360/32

[56] References Cited

U.S. PATENT DOCUMENTS

| 4,446,490 | 5/1984 | Hoshimi et al. ............... 360/32 |
| 4,604,657 | 8/1986 | Fukami et al. ............... 360/32 |
| 5,508,967 | 4/1996 | Karino ........................... 365/219 |

FOREIGN PATENT DOCUMENTS 193765  9/1986  European Pat. Off. .

Primary Examiner—Temesghen Ghebretinsae
Attorney, Agent, or Firm—Antonelli, Terry, Stout, & Kraus, LLP

[57] ABSTRACT

The invention once stores PCM data to a memory and after a predetermined time is elapsed, reading in again and making to output whereby makes to delay the PCM data. The invention comprises a memory for once storing a PCM data converted to parallel, a delay time setting circuit for setting a delay time of PCM data, and a comparator and control circuit for comparing a setting value from the delay time setting circuit and a high order 10 bits writing address of the memory and thereby providing an address and control signal for either initiating a high order 10 bits reading address of the memory or else for writing or reading to the memory.

3 Claims, 2 Drawing Sheets

DELAY CIRCUIT OF PCM DATA

BACKGROUND OF THE INVENTION

The present invention relates to a delay circuit of PCM data, and more particularly, to a delay circuit of digital PCM data for obtaining a delay effect of network in testing a function and performance of echo canceler.

DESCRIPTION OF THE RELATED ARTS

In general, an echo is produced in a long distance telephone network including an international telephone or a satellite communication, or in case of connecting a digital mobile radio communication switching network and a public telephone network.

Here, an inconvenience is given to a talking because a pure transmission delay according to long distance in case of former, and because a processing delay is produced due to a voice coding for efficiency of radio channel in case of latter.

There is U.S. Pat. No. 4,604,657 for a conventional technique for delaying a PCM data. However, said conventional technique has a circuit for delaying a PCM serial data during merely one block by utilizing a memory.

Accordingly, it is impossible to transmit by adjusting a frame of PCM data in the conventional technique.

SUMMARY OF THE INVENTION

Therefore, it is an object of the present invention to provide a delay circuit of PCM data for obtaining a delay effect of network by timely delaying a PCM data by storing once the PCM data to a memory and then outputting by reading in again after a predetermined time.

In order to accomplish above object, the present invention comprises a sub-highway SHW transmitting and receiving means for transmitting and receiving a PCM data of a predetermined channel of serial form received from a time switching device; a serial/parallel and parallel/serial converting means for either converting the PCM data of serial form received through the sub-highway transmitting means to a parallel data of predetermined bits for storing to a memory in response to an operating clock to be provided or else converting the PCM data of parallel form stored to a memory to a serial; a memory for storing once the PCM data converted through the serial/parallel and parallel/serial converting means; a delay time setting means for setting a delay time of data at initial time or during operation; and a comparing and controlling means for comparing a setting value of the delay time setting means and a writing address of the memory in response to a clock and synchronous pulse fed from the sub-highway transmitting means, providing an address and access control signal either for initiating a reading address of a memory or else for writing or reading to the memory, and providing an operating clock to the serial/parallel and parallel/serial converting means; and a technical feature of the present invention is to delay the PCM data of a predetermined channel during any frame.

BRIEF DESCRIPTION OF THE DRAWINGS

FIG. 3(A) and FIG. 3(B) are timing wave form charts of PCM data for giving and receiving between a time switching device and a sub-highway SHW transmitting and receiving means in accordance with the present invention, and FIG. 3(A) is 4.096 MHz clock, FIG. 3(B) is 8 KHz synchronous pulsed and FIG. 3(C) shows PCM data.

DESCRIPTION OF THE PREFERRED EMBODIMENT

Hereinafter, a preferred embodiment of the present invention will be described more in detail with reference to the accompanying drawings.

Figure 1:
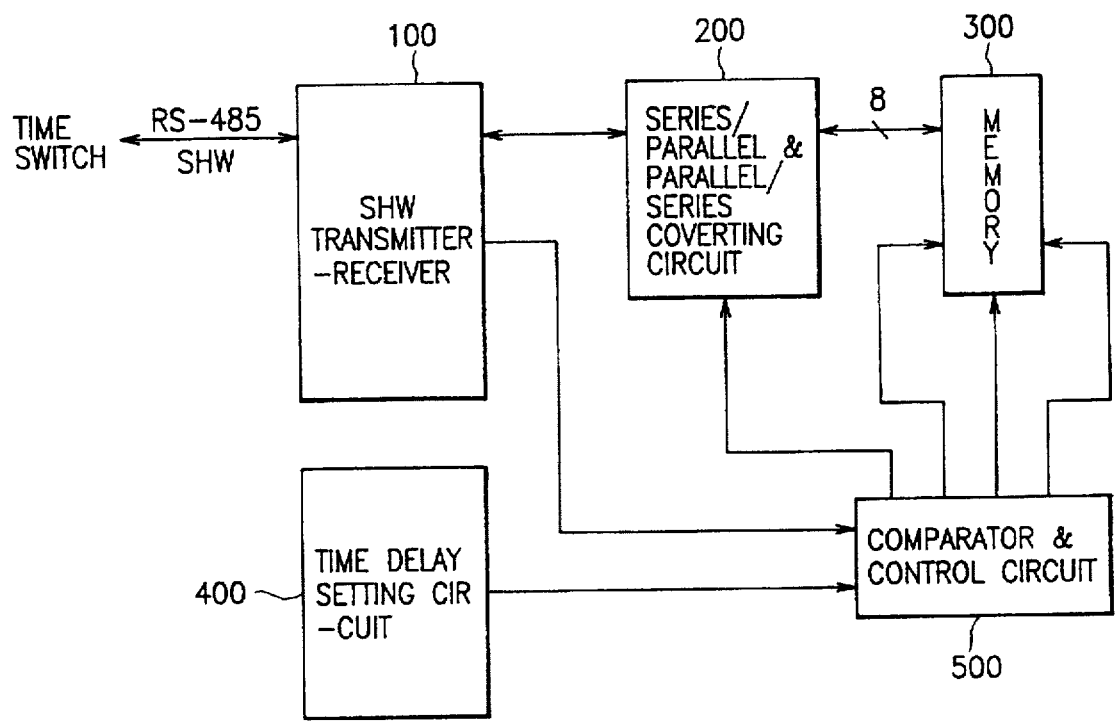
FIG. 1 is a block diagram of a delay circuit of PCM data of the present invention.

Firstly, the present invention comprises, as shown in FIG. 1, a sub-highway (hereinafter called as 'SHW') transmitting and receiving means 100 for transmitting and receiving 2.048 Mbps (32 channels) PCM data of serial form from a time switching device; a serial/parallel and parallel/serial converting circuit 200 for either converting a PCM data of received serial form to a parallel for storing to a memory 300 in response to an operating clock provided or else for converting a parallel form stored to the memory 300 to a serial; a memory 300 for once storing the PCM data; a delay time setting circuit 400 for setting a delay time of data at initial time or during operation; and a comparing and controlling circuit 500 for comparing a setting value from the delay time setting circuit 400 and a high order 10 bits address of the memory 300 in response to a clock and synchronous pulse provided from the SHW transmitting and receiving means 100 and then for providing an address and access control signal either for initiating a high order 10 bits reading address of the memory or else for writing or reading to the memory, and for feeding an operating clock to the serial/parallel and parallel/serial converting circuit 200.

Figure 2:
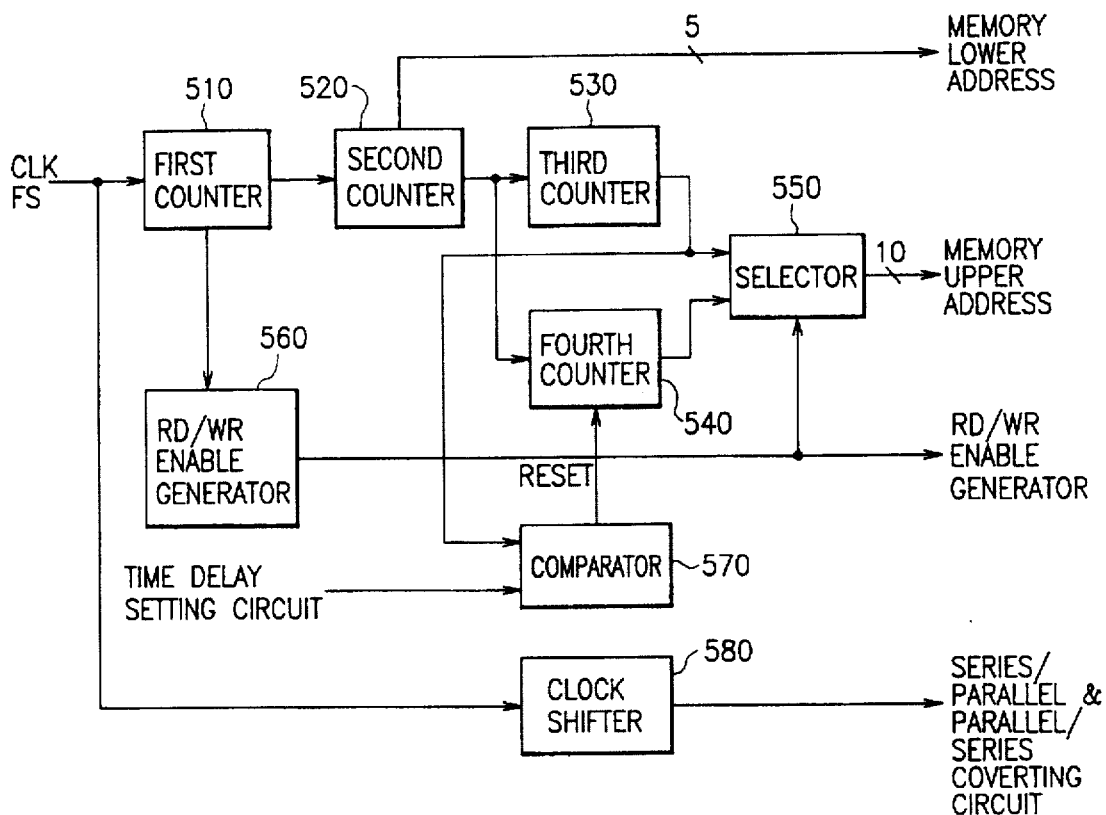
FIG. 2 is a detailed block diagram of a comparator and a control circuit in FIG. 1.

In above construction, a detailed construction of the comparing and control circuit 500 comprises, as shown in FIG. 2, a first counter 510 consisting of 3 bits for writing and reading to the memory 300 in a byte unit; a second counter 520 providing low order 5 bits address for storing or reading in to the memory 300 by making 32 channels constructed in a ST (serial telecommunication)-bus form to one frame; a third counter 530 for providing a high order 10 bits address for storing (or writing) the PCM data received together with the second counter 520 to the memory 300; a fourth counter 540 providing a high order 10 bits address for reading the PCM data stored to the memory 300 together with the second counter 520; a selecting means 550 outputting a memory high order 10 bits address by selecting any one among the high order 10 bits address for storing to the memory 300 and a high order 10 bits address for reading the PCM data from the memory 300; a reading/writing enable signal generating means 560 for receiving an output of the first counter 510 as an input and for generating a reading/writing enable signal of the memory; a comparing means 570 for comparing an output value of the third counter 530 and a value set at the delay time setting circuit 400, and when the values are same as its compared result, initiating a value of the fourth counter 540 determining a high order 10 bits address of memory reading address at a setting or resetting initial time of the delay time setting circuit 400; and a shift clock means 580 for feeding an operating clock to shift registers of the serial/parallel and parallel/serial converting circuit 200 in response to a clock CLK and a synchronous pulse FS fed from the SHW transmitting and receiving means 100.

In above description, the first, second, third and fourth counters 510, 520, 530, 540 are consisted of respectively 3 bits, 5 bits, 10 bits and 10 bits counter.

Operation constructed as these will be described with reference to FIGS. 3(A) to (C).

Figure 3:
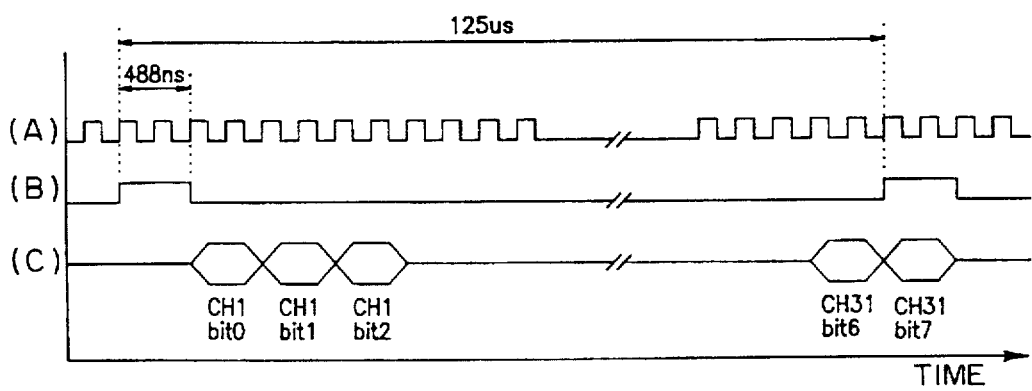

The SHW transmitting and receiving means 100 converts 2.048 Mbps PCM data [refer to FIG. 3(C)] of RS-485 or RS-422 differential level received from the time switching device, 4.096 MHz clock [refer to FIG. 3(A)] and 8 KHz synchronous pulse [FS; refer to FIG. 3(B)] to TTL level and then transfers respectively to the serial/parallel and parallel/serial converting circuit 200 and the comparator and control circuit 500, and converts the PCM data of TTL level received from the serial/parallel and parallel/serial converting circuit 200 to the differential level whereby transmits to the time switching device.

According to this, the serial/parallel and parallel/serial converting circuit 200 converts the serial PCM data received from the SHW transmitting means 100 to a parallel data of 8 bits by utilizing a serial/parallel converting shift register whereby stores to the memory 300.

And, it converts the 8 bits parallel PCM data outputted from the memory 300 to a serial through the parallel/serial converting shift register whereby transmits to the SHW transmitting means 100.

At this moment, the clock provided to these shift registers is provided by the comparator and control circuit 500.

According to this, the memory 300 once stores the PCM data converted by the serial/parallel and parallel/serial converting circuit 200 and then it is used for reading after a predetermined time is elapsed.

This magnitude of the memory 300 and a maximum delay time of PCM data are proportional each other.

It is possible to make delay up to 1024 frames maximum and about up to 128 ms timely by using 32K×8 bits memory in an embodiment of the present invention.

According to this, the delay time setting circuit 400 can set initially a delay time of PCM data or reset during operation, and its setting value is between 1 to 1024 frames.

The delay operation for PCM data exhibited in this invention according to this is as following example.

Firstly, when assuming that the delay time setting circuit 400 is set to 10, the comparator 570 waits until the 10 bits counter 530 determining a writing high order 10 bits address of the memory 300 becomes to 10 and when it becomes to 10, it initiates a value of the 10 bits counter 540 determining a reading high order 10 bits address of the memory 300 to 0 (zero).

When this is done, the 10 bits writing address of the memory designating an access address by one frame (32 channels) unit exhibits 10, and a high order 10 bits reading address of the memory 300 exhibits 0.

At this moment, a difference as much as 10 is made between the high order 10 bits writing address of the memory 300 and the high order 10 bits reading address of the memory 300, consequently the time delay becomes to 10 frames (1.25 ms).

In above description, maximum delay time can be extended by changing the 10 bits counter 530, and the 10 bits counter 540 to n bits counter, and changing a magnitude of the memory 300.

The present invention as above can selectively obtain a delay effect of actual network without doing a general test at a laboratory by providing a device requiring a delay of PCM data, particularly echo canceler.

Accordingly, the present invention has a useful effect in testing a function and performance of the echo canceler, and can be made to many practical applications for a place requiring a delay of PCM data.

What is claimed is:

1. In a delay circuit of PCM data, the delay circuit of PCM data comprising:

a sub-highway SHW transmitting and receiving means for transmitting and receiving a PCM data of a predetermined channel of serial form received from a time switching device;

a serial/parallel and parallel/serial converting means for either converting the PCM data of serial form received through the sub-highway transmitting and receiving means to a parallel data of predetermined bits for storing to a memory in response to an operating clock to be provided or else converting the PCM data of parallel form stored in the memory to a serial;

the memory for storing once the PCM data converted through the serial/parallel and parallel/serial converting means;

the delay time setting means for setting a delay time of data at initial time or during operation; and a comparing and controlling means for comparing a setting value of the delay time setting means and a writing address of the memory in response to a clock and synchronous pulse fed from the sub-highway transmitting and receiving means, providing an address and access control signal either for initiating a reading address of the memory or else for writing or reading to the memory, and providing the operating clock to the serial/parallel and parallel/serial converting means; and characterized by making to delay the PCM data of a predetermined channel during any frame.

2. A delay circuit of PCM data as defined in claim 1, wherein said comparator and control means comprises:

a first counter 510 consisting of 3 bits for writing and reading to the memory 300 in a byte unit;

a second counter 520 providing low order 5 bits address for storing or reading in to the memory 300 by making 32 channels constructed in a ST(serial telecommunication)-bus form to one frame;

a third counter 530 for providing a high order 10 bits address for storing (or writing) the PCM data received together with the second counter 520 to the memory 300;

a fourth counter 540 providing a high order 10 bits address for reading the PCM data stored to the memory 300 together with the second counter 520;

a selecting means 550 outputting a memory high order 10 bits address by selecting any one among the high order 10 bits address for storing to the memory 300 and a high order 10 bits address for reading the PCM data from the memory 300;

a reading/writing enable signal generating means 560 for receiving an output of the first counter 510 as an input and for generating a reading/writing enable signal of the memory;

a comparing means 570 for comparing an output value of the third counter 530 and a value set at the delay time setting circuit 400, and when the values are same as its compared result, initiating a value of the fourth counter 540 determining a high order 10 bits address of memory reading address at a setting or re-setting initial time of the delay time setting circuit 400; and a shift clock means 580 for feeding the operating clock to shift registers of the serial/parallel and parallel/serial converting circuit 200 in response to the clock CLK and a synchronous pulse FS fed from the SHW transmitting and receiving means 100.

3. A delay circuit of PCM data as defined in claim 2, wherein said first, second, third and fourth counters 510, 520, 530, 540 are consisted of respectively 3 bits, 5 bits, 10 bits and 10 bits.

* * * * *